United States Patent [19]

Scarzello

[11] 3,715,654
[45] Feb. 6, 1973

[54] CRYSTAL MAGNETOMETER AND GRADIOMETER

[75] Inventor: John F. Scarzello, Silver Spring, Md.

[73] Assignee: The United States of America as represented by the Secretary of the Navy

[22] Filed: June 4, 1970

[21] Appl. No.: 43,330

[52] U.S. Cl. ............................................. 324/.5 R
[51] Int. Cl. ........................................... G01r 33/08
[58] Field of Search.......... 324/.5 E, .5 AH; 333/24 G

[56] References Cited

UNITED STATES PATENTS

| 3,191,118 | 6/1965 | Jung | 324/.5 |
| 3,441,837 | 4/1969 | Desormiere | 324/.5 E |
| 3,100,866 | 8/1963 | Zimmerman | 324/.5 E |

OTHER PUBLICATIONS

A. H. Maki–Magnetic Field Tracking Nuclear Resonance Gaussmeter–Rev. of Sci. Instr.–36(3)–3/65–pp. 325–327

Primary Examiner—Michael J. Lynch
Attorney—R. S. Sciascia, J. A. Cooke and R. J. Erickson

[57] ABSTRACT

A sensor for measuring component magnetic fields utilizing a first magnetic field to be measured, and a perpendicular second magnetic field. The fields are modulated by first and second coils individually wound around first and second nonmagnetic cores. The nonmagnetic cores are hollow and intersect. A paramagnetic crystal is located at the intersection of the cores and is oriented to provide a maximum nuclear magnetic resonance signal. In one embodiment, a magnetometer is employed which includes a sweep generator, marginal oscillator, feedback loop and the sensor for determining the magnitude of the component magnetic field to be measured. An alternative embodiment utilizes a sweep generator, marginal oscillator, differentiating network and the sensor for determining the point gradient of the fiel to be measured.

2 Claims, 9 Drawing Figures

CRYSTAL MAGNETOMETER AND GRADIOMETER

BACKGROUND OF THE INVENTION

This invention relates generally to magnetometers and, more particularly, to a crystal magnetometer and gradiometer.

Magnetometers may be broadly defined as any instrument adapted to measure magnetic fields. Examples of such instruments include conventional optically pumped resonance magnetometers which utilize rubidium vapor, metastable helium, or cesium vapor to obtain indications of the measured magnetic field. These instruments are described in an article by A. L. Bloom in Applied Physics, Vol. 1, p. 61 of Jan. 1962. These instruments are total field measuring devices, that is, the instruments provide an indication of the total field within a specified volume by vectorally summing the various magnetic fields within the volume. The result is a scalar quantity since the magnetometer is unable to discern the direction of the resultant magnetic field vector but merely provides an indication of its magnitude. A disadvantage arises when these total field magnetometers are utilized as gradiometers since the measured gradient becomes a function of various directional variables rather than one discernable direction.

Magnetometers have been devised for measuring component magnetic fields, that is, magnetic fields in a specified direction. The field measured is a vector quantity since not only is the magnitude of the resultant magnetic field vector provided but the specified direction is also known. Similarly, gradiometers responsive to component magnetic field measurements provide gradient measurements which are functions of one specified direction only.

Heretofore employed magnetometers for measuring component magnetic fields utilize a core of high permeability material which is driven into and out of saturation by an excitation a.c. current coil wound about the core. These fluxgate or saturated core magnetometers include a pick-up winding or coil, located on the same axis as the excitation coil, which is tuned to receive the second harmonic of the excitation frequency signal. The second harmonic signal from the pick-up coil is compared to an externally generated second harmonic signal, proportional to the excitation signal, to provide an indication of the magnetic field along the axis of the pick-up coil. These fluxgate or saturating core magnetometers have been somewhat unsatisfactory in providing the dynamic range and accuracy required in the measurement of many magnetic fields.

Additionally, fluxgate or saturating core magnetometers have been utilized as gradiometers, that is, devices which are adapted to measure the difference in magnetic field intensity between two points along an axis. The use of gradiometers for this purpose is advantageous since they are somewhat less affected by geomagnetic noise than are conventional magnetometers. However, fluxgate or saturating core gradiometers have been somewhat undesirable since physical limitations on probe size and problems in alignment have provided gradiometers which are of limited sensitivity and, additionally, are unable to provide a measurement of "point" gradients which is desirable in many applications.

SUMMARY OF THE INVENTION

Accordingly, one object of the present invention is to provide a crystal magnetometer and gradiometer.

Another object of the instant invention is to provide an accurate and sensitive magnetometer and gradiometer.

A still further object of the instant invention is to provide a magnetometer and gradiometer responsive to component magnetic fields.

Another object of the present invention is to provide a gradiometer capable of measuring point gradients.

Still another object of the invention is to provide an improved sensor for sensing magnetic fields.

Briefly, these and other objects of the instant invention are attained by providing a magnetometer which utilizes the nuclear magnetic resonance of a paramagnetic crystal for detecting component magnetic fields. The orientational dependence of the nuclear resonance phenomena in crystals provides a magnetometer and gradiometer whose crystal sensing element is adjusted along the preferred axis to provide greater sensitivity and accuracy in measuring component magnetic fields.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

The principle of paramagnetic resonance and the information obtained therefrom is relatively well known and is disclosed in an article by R. G. Marcley in the American Journal of Physics, Vol. 29, 1961, at page 492 as well as in the U.S. Pat. Nos. Re. 23,950; 3,049,661; and 3,166,707. Briefly paramagnetic substances exhibit nuclear magnetic moments which are initially randomly oriented due to thermal energy. When an ambient magnetic field is applied to the substance, the nuclear magnetic moments tend to align parallel with the applied ambient magnetic field. The tendency to align parallel with the ambient magnetic field is impeded, however, by the random orientation due to the thermal energy of the substance and, therefore, the magnetic moments precess about the direction of the ambient magnetic field with a particular frequency. The precessional frequency, called the Larmor frequency, is proportional to the applied ambient magnetic field by the relationship:

$$f = (\pi)/(2\gamma) \text{Ho}$$

wherein $f$ is the Larmor frequency, Ho is the magnitude of the ambient magnetic field, and $\gamma$ is the gyromagnetic ratio which is a constant dependent on the particular paramagnetic substance.

If the paramagnetic substance is subjected to a radio frequency (RF) magnetic field, $H_1$, applied perpendicular to the ambient magnetic field Ho, an interaction occurs between the ambient and RF fields. When the frequency of the RF magnetic field is adjusted to the Larmor frequency, the energy provided by the RF field is almost totally absorbed in producing a torque on the magnetic moments. Thus, by varying the frequency of the RF magnetic field the Larmor precessional frequency may be ascertained and the ambient magnetic field Ho calculated using the relation:

$$\text{Ho} = (2\gamma f/\pi).$$

Paramagnetic crystals, like other paramagnetic substances, exhibit nuclear magnetic resonance and, by applying a RF magnetic field of a particular frequency perpendicular to the ambient magnetic field, the energy absorption phenomena may be ascertained to provide an indication of the ambient field. Paramagnetic crystals also exhibit nuclear magnetic resonance which is dependent on the orientation of the crystal with respect to the axis of the ambient and RF magnetic fields. By rotating the crystal until this "preferred axis" is reached, the sensitivity of the crystal in ascertaining the magnitude of the ambient magnetic field is greatly increased over heretofore employed magnetometer systems utilizing metastable helium, rubidium vapor, or the like. Furthermore, by utilizing a paramagnetic crystal as the sensing element, the magnetometer or gradiometer is able to sense component magnetic fields, that is, only those fields having a component in the ambient field direction rather than a total field measurement which provides a vector sum measurement of all fields within a conical volume around the axis of the ambient magnetic field.

Figure 1A:
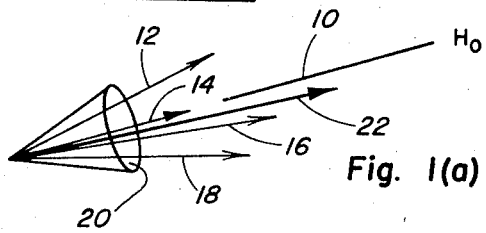
FIGS. 1(a) and 1(b) are vector diagrams of the measured magnetic fields according to total field and component field measurement, respectively.
Figure 1B:
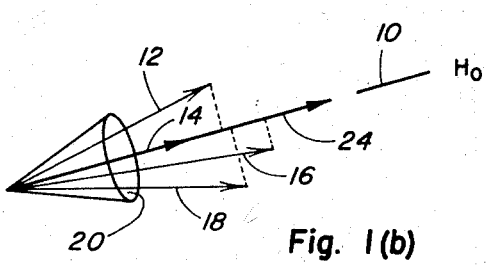

Referring now to the drawings wherein like reference numerals designate corresponding parts throughout the several views and, more particularly, to FIGS. 1(a) and 1(b) thereof the distinction between total field and component field measurement is shown. The direction of an ambient magnetic field Ho which may be the earth's magnetic field or an auxilliary field which is sensed by a magnetometer is shown at 10. If the magnetometer is a total field magnetometer such as, for example, a conventional optically pumped magnetometer utilizing rubidium vapor or metastable helium or the like, the magnetometer will measure all magnetic fields 12, 14, 16, and 18 within a conical volume 20 surrounding the ambient field direction. The resultant field 22, provided by vectorally summing vectors 12-18, is not necessarily in the Ho direction 10 and, furthermore, the direction of resultant 22 is not ascertainable. Since only the magnitude of resultant 22 is determined, the measured magnetic field becomes a scalar quantity. Additionally, when the heretofore employed conventional total field measuring devices are utilized as gradiometers, the gradient becomes a function of three coordinate axis.

In contrast, component field measurement is illustrated in FIG. 1(b). The use of a crystal paramagnetic sensing element provides that only the components of vectors 12-18 in the Ho direction 10 are measured. Thus, resultant vector 24, equal to the sum of the components of vectors 12-18 in the Ho direction, is measured. This is a vector quantity since not only is the magnitude of vector 24 determinable but its direction is known. Similarly, a gradiometer utilizing component field measurement is able to provide a measure of gradients which are a function of the ambient field direction 10 only rather than functions of more than one directional variables.

Figure 2:
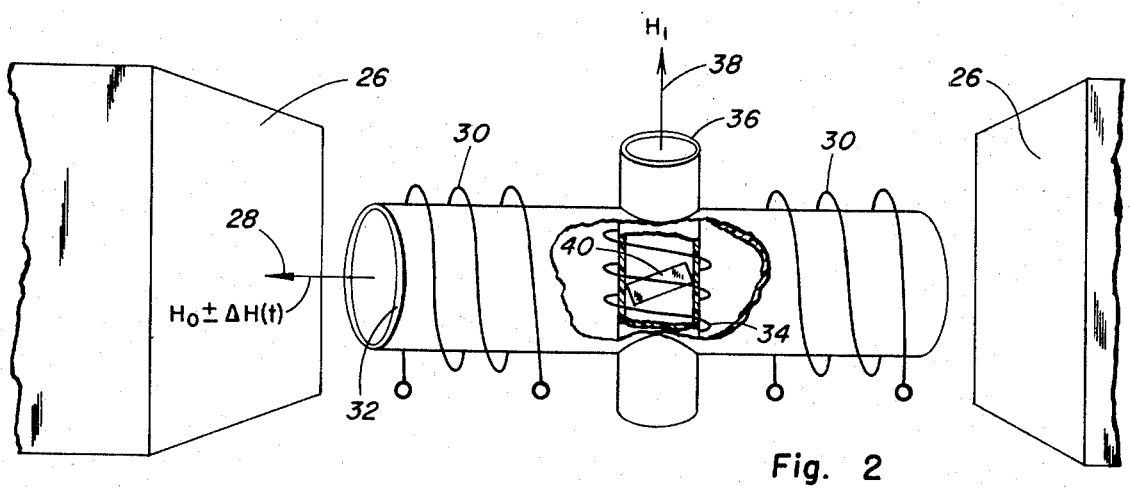
FIG. 2 is a schematic view, partly in section, of the sensor element of the present invention.

The sensing element utilized in the magnetometer and gradiometer of the present invention is illustrated in FIG. 2. As hereinbefore explained, it is desired to measure an ambient magnetic field Ho which may be produced, for example, by a magnetic source such as magnets 26. It is readily apparent that if the magnetic field produced by magnets 26 is known, then the component field between the magnets may be measured to provide an indication of any component magnetic field provided by an extraneous magnetic source or the like. As hereinafter explained, ambient magnetic field Ho is modulated an amount $\pm \Delta H$ to provide a changing magnetic field Ho $\pm \Delta H(t)$ as indicated by vector 28. The modulation is provided by windings, such as Helmholtz coils 30 or the like, schematically shown as wound around a hollow core 32 which may be of a nonmagnetic material, such as, for example, a plastic or the like.

A radio frequency (RF) magnetic field $H_1$ is provided by a winding by coil 34 which is wound around a hollow nonmagnetic core, such as a plastic core 36. Core 36 is narrower than core 32 and is oriented such that the RF magnetic field $H_1$, indicated by a vector 38, is perpendicular to the modulated ambient magnetic field 28. Core 36 may be equal in diameter to core 32 or, if desired, may be of a larger diameter.

As hereinbefore explained, ambient magnetic field 28 and perpendicular RF magnetic field 38 interact on paramagnetic substances exposed thereto to provide an indication of the Larmor precessional frequency of the substance and, therefore, an indication of the ambient magnetic field when the frequency of the RF field is adjusted to the Larmor frequency. The paramagnetic substance utilized in the sensing element of FIG. 2 is a paramagnetic crystal 40 which may be composed of NaI, KI, $CaSO_4 \cdot 2H_2O$, $KF \cdot 2H_2O$, or any other paramagnetic crystal material exhibiting an orientational preference to the nuclear magnetic resonance phenomena.

More particularly, crystal 40 is disposed in hollow core 36 at such an angle that the amplitude of the sensed nuclear magnetic resonance signal is a minimum. This angle may be defined as the "preferred axis" of the crystal and, as hereinafter more fully explained, when crystal 40 is in such an orientation, the sensitivity of the magnetometer or gradiometer to nuclear magnetic resonance is at a maximum. Crystal 40 is held in the preferred axis orientation within core 36 by any conventional means, such as, for example, by an epoxy glue or the like (not shown).

Figure 5A:
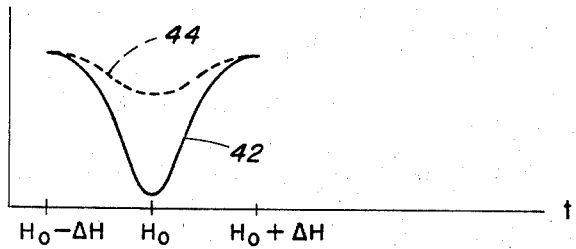
FIGS. 5(a) – 5(d) are graphical diagrams of various waveshapes associated with the embodiment of FIGS. 3 and 4.

Referring now to FIG. 5(a), the amplitude of the sensed nuclear magnetic resonance signal is shown as a function of the time varying ambient magnetic field. As hereinafter more fully explained, the ambient magnetic field Ho is determined from the minimum of the nuclear magnetic resonance signal. The solid line 42 represents the nuclear magnetic resonance signal with crystal 40 in the preferred axis while the dashed line 44 represents the corresponding signal detected when the crystal is not in the preferred axis. It is readily apparent by comparing the preferred and non-preferred orientational signals that a far better sensitivity for measuring Ho is obtained when the crystal is in the preferred axis.

Figure 3:
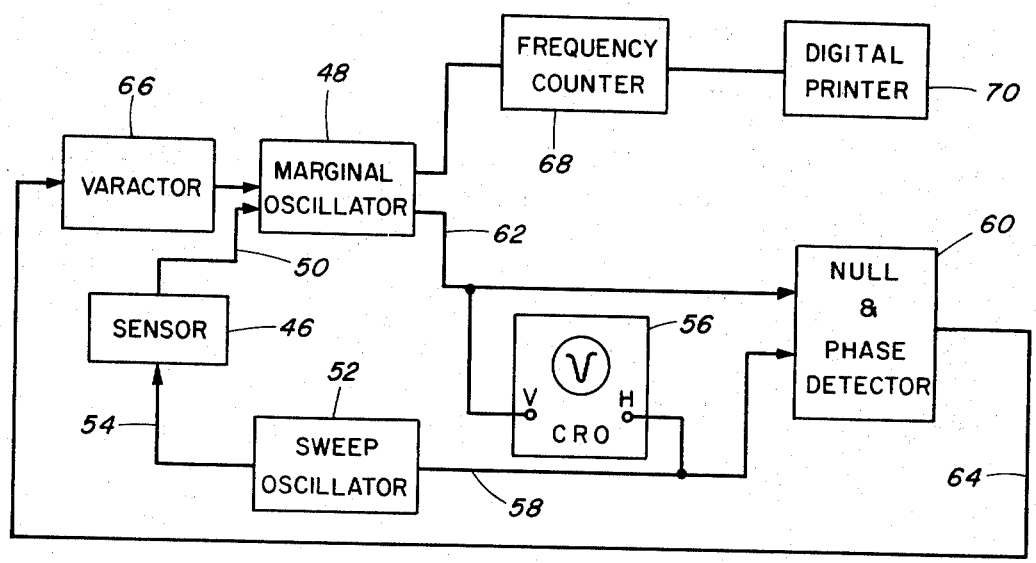
FIG. 3 is a block diagrammatic view of one embodiment of the invention.

Referring to FIG. 2 is conjunction with FIG. 3, one embodiment of the present invention utilized as a magnetometer is shown. A sensor 46, substantially the same as the sensor of FIG. 2, is coupled to a frequency responsive device 48. More particularly, coil 34 is connected to a conventional marginal oscillator 48. The marginal oscillator is a radio frequency oscillator which oscillates marginally at the Larmor resonant frequency. A further description of a marginal oscillator may be found in an article by R. V. Pound and W. D. Knight in the Review of Scientific Instruments, Vol. 21, p 219, (1950). Coil 34, which is wound around crystal 40, is coupled to marginal oscillator 48 via a lead 50 and forms a load on the marginal oscillator which produces the RF magnetic field 38.

The ambient magnetic field 28 is modulated, as hereinbefore explained, by coils 30. The modulation signal is provided by a signal generating device, such as a sweep oscillator 52 connected to coils 30 by a lead 54. Sweep oscillator 52 such as shown in Hewlett Packard 1967 catalog as being Model 202A, is also coupled to a display device, such as the horizontal plates of a conventional cathode ray oscilloscope 56, by way of a lead 58. Lead 58 also connects sweep oscillator 52 to a conventional null and phase detector 60, such as Princeton Applied Research Corp. Model HR8 and provides one input thereto. The other input to null and phase detector 60 is provided from the output of marginal oscillator 48 by a lead 62 which also couples the marginal oscillator to the vertical plates of oscilloscope 56.

As hereinafter more fully explained, null and phase detector 60 provides an output feedback signal at a lead 64 which adjusts a dc controlled capacitor, such as a varactor 66, coupled between the detector 60 and marginal oscillator 48 to lock the latter on the null and zero phase of the nuclear magnetic resonance signal. The output of the marginal oscillator may be directly read via a frequency counter 68, such as shown in Hewlett Packard 1967 catalog as being Model 5245L and a conventional digital printer 70, such as shown in Hewlett Packard 1967 catalog as being Model 5050A connected to the oscillator.

The operation of the magnetometer may best be understood by reference to FIGS. 2, 3, 5(a), and 5(b) of the drawings. As hereinbefore explained, a direct relation exists between the precessional frequency f of the magnetic moments in crystal 40 and the ambient magnetic field Ho according to the relationship:

$$f = (\gamma)/(2\pi) Ho.$$

Figure 5B:
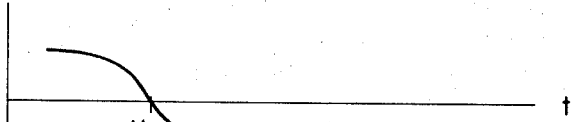

Similarly, when the frequency of the RF magnetic field 38 is adjusted to the precessional frequency, energy absorption occurs which is sensed by marginal oscillator 48 which produces the RF field. FIGS. 5(a) and 5(b) show the amplitude and phase, respectfully, of the nuclear magnetic resonant signal sensed by marginal oscillator 48. The magnetic field 28 is modulated about is ambient value Ho by an amount $\pm \Delta H$ with a corresponding change in the sensed nuclear magnetic resonance signal 42 which reaches a null and zero phase at Ho. Waveshape 42 may be viewed directly on oscilloscope 56. Additionally, feedback from null and phase detector 64 controls varactor 66 which locks the marginal oscillator to the null and zero phase nuclear magnetic resonance signal, corresponding to Ho, by controlling the frequency of the oscillator. The lock-on feedback is advantageous since the resonance characteristic 42 is not linear corresponding to changes in field intensity about Ho. The frequency of the marginal oscillator which is equal to the precessional frequency f is directly read on digital printer 70 and, therefore, the ambient field may be determined. It is to be noted that the magnetometer according to the present invention measures component magnetic fields and provides increased sensitivity due to the use of paramagnetic crystal 40 oriented in the preferred axis.

Figure 4:
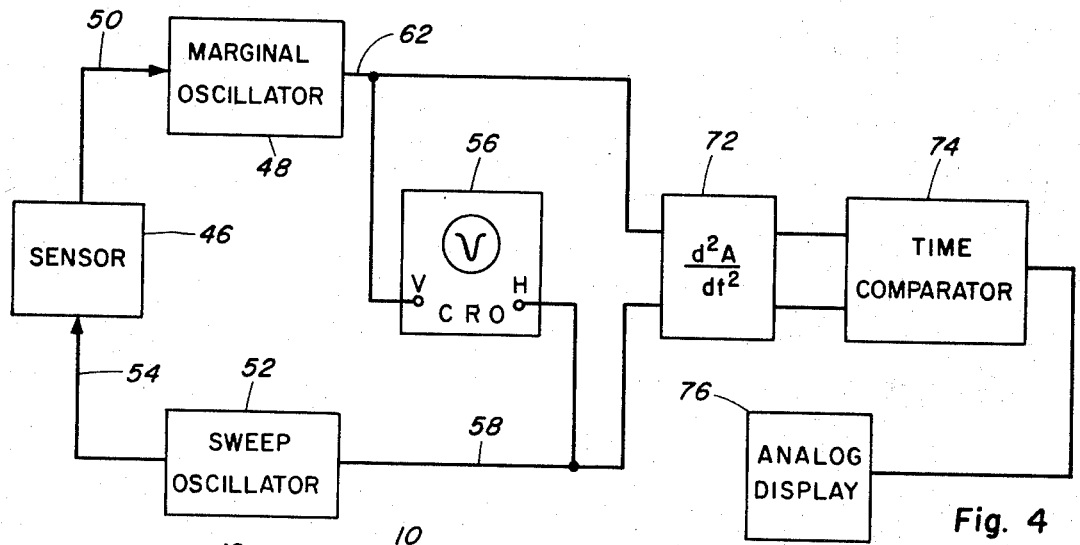
FIG. 4 is a block diagrammatic view of an alternative embodiment of the present invention.
Figure 5C:
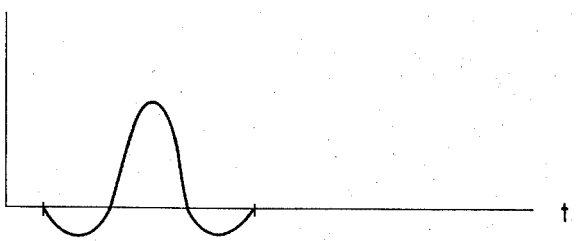
Figure 5D:
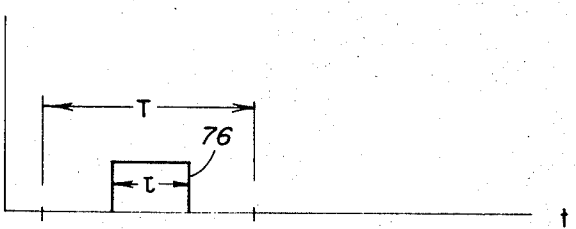

FIG. 4 illustrates another embodiment of the invention utilized as a gradiometer. The marginal oscillator 48 and sweep oscillator 52 are connected to coils 34 and 30 by leads 50 and 54, respectively. Similarly, marginal oscillator 48 and sweep oscillator 52 are connected to the vertical and horizontal deflection plates of oscilloscope 56, respectively, via leads 62 and 58. A conventional double differentiator 72, such as a Philbrick Corp. Model SP656 is coupled to the outputs of the marginal oscillator and sweep oscillator. The input to the double differentiator is the nuclear magnetic resonance signal shown in FIG. 5(a). The resonance signal is double differentiated with respect to time in differentiator 72 to provide a signal having two zero cross-overs as indicated in FIG. 5(c). The double differentiated signal is processed in a time comparator 74 which includes a multivibrator or other gated circuitry or the like (not shown) providing a pulse 76 of duration $t$ as seen in FIG. 5(d). The width $t$ is compared to the time T, which corresponds to the period of modulation of the ambient field. The point gradient is calculated from the relation $$G = K(t/T)$$

wherein G is the point gradient and $K$ is a constant. The value of the point gradient may be read directly on a conventional analog display 76, such as a Sandborn Model 320 connected to the time comparator.

It should be readily apparent, therefore, that the present invention provides an indication of component magnetic fields of greater sensitivity and accuracy. Furthermore, an accurate indication of point gradients is provided by using a paramagnetic crystal oriented in the preferred axis.

Obviously, numerous modifications and variations of the present invention is possible in light of the above teachings. Thus, other lock-in systems, such as, for example, utilizing digital circuitry may be employed. It is to be understood, therefore, that within the scope of the appended claims the invention may be practiced otherwise than as specifically described herein.

What is claimed as new and desired to be secured by Letters Pat. of the U.S. is:

1. A system for measuring magnetic fields comprising
    means for modulating a first magnetic field to be measured,
    means for producing a second magnetic field having a frequency $H_1$ perpendicular to said first magnetic field,
    a paramagnetic crystal for measuring magnetic fields having components in the direction of said first magnetic field, said paramagnetic crystal exhibiting nuclear magnetic resonance of a frequency related to the magnetic intensity of a component magnetic field to be measured when said crystal is exposed to said first magnetic field,
    means for varying the frequency of said second magnetic field,
    means responsive to the energy absorbed by said crystal for providing an energy absorption signal,
    means responsive to said energy absorption signal for determining when said frequency of said second magnetic field is equal to the nuclear magnetic resonance frequency of said paramagnetic crystal,
    means responsive to said energy absorption signal for providing a signal proportional to the second differential with respect to time of said energy absorption signal, and
    means responsive to said signal proportional to the second differential of said absorption signal for providing an indication of the point gradient in said paramagnetic crystal.

2. A system for measuring magnetic fields according to claim 1 wherein
    said paramagnetic crystal is oriented with respect to said first and said second magnetic fields to provide an energy absorption signal having the maximum sensitivity with respect to said component field to be measured.

* * * * *